Jan. 23, 1962

K. E. JAMES 3,017,695

METHOD OF SIZING BELLS AND SPIGOTS OF
STEEL-CYLINDER CONCRETE PIPE

Filed Jan. 31, 1957

KENNETH E. JAMES
INVENTOR.

BY *Hazard & Miller*

ATTORNEYS.

United States Patent Office 3,017,695
Patented Jan. 23, 1962

3,017,695
METHOD OF SIZING BELLS AND SPIGOTS OF STEEL-CYLINDER CONCRETE PIPE
Kenneth E. James, Covina, Calif., assignor to United Concrete Pipe Corporation, Baldwin Park, Calif., a corporation of California
Filed Jan. 31, 1957, Ser. No. 637,381
2 Claims. (Cl. 29—523)

This invention relates to a method of sizing the bells and spigots of steel-cylinder concrete pipe, and particularly the bells and spigots of pipe, wherein a gasket or sealing ring is disposed in a metallic channel on the spigot and which, when the bell and spigot are assembled together, is positioned against a metallic lining on the interior of the bell.

Explanatory of the present invention, in the construction of that type of concrete pipe to which this invention relates the customary procedure is to first form a sheet metal tube which extends from end to end of the pipe. This tube frequently is lined with a self-hardening cementitious lining that may be applied centrifugally. On the exterior of the tube there may be applied a self-hardening concrete coating in which there may or may not be metallic reenforcements. Where the pipe joint between adjoining sections of pipe is to have a rubber gasket or sealing ring interposed between the end of the spigot and the interior of the bell the sheet metal tube is flared at the interior of the bell so as to be exposed therein for engagement by the rubber gasket. The spigot end of the pipe has an endless ring-like channel applied around the exterior of the tube, and this channel provides a seat for the gasket or sealing ring.

It is desirable that the portion of the seel tube which forms a metallic lining on the interior of the bell be reenforced or backed up by a similar endless ring-like channel.

In constructing pipe of this character endless rings are telescoped over the ends of the steel tube. In the case of the spigot end, the endless ring is usually in the form of a channel designed to receive a rubber gasket. In the case of the bell end the ring frequently is in the form of a channel but may have other shapes. The fit between the ring and the steel tube or cylinder is relatively loose when the ring is initially applied. In relatively large sizes of pipe it is difficult to maintain tolerances within desirable limits. In other words, the spigot channel when telescoped over the metallic tube or cylinder may be slightly oversized. Also, the flared end of the tube on the interior of the bell may be slightly undersized. If this is the case insertion of the spigot into the bell is rendered difficult. If the reverse is true, namely that the spigot channel is undersized and the flared end of the tube or cylinder within the bell is oversized the joint may be so loose that the rubber gasket is incapable of maintaining an adequate seal.

It is a primary object of the present invention to provide a novel method by which the channel on the spigot and the flared end of the tube that is surrounded by the channel in the bell can be seized relatively to each other so as to properly fit within acceptable tolerances.

Briefly stated, the method consists of assembling the channel and the tube together telescopically at each end of the pipe and then expanding the tube and channel to a limited extent beyond the elastic limits or yield points of the metals of which these parts are formed. After the elastic limit or yield point has been exceeded the expansion is continued slightly beyond the nominal sizes that these parts are to finally have. The expanding means is then removed and even though the elastic limit of the material has been exceeded there is still a slight amount of springback or contraction. However, this amount of springback is comparatively uniform with a given material from the expanded condition wherein the yield point or elastic limit has been exceeded. Consequently, even though the metal in the bell springs back or contracts slightly from its oversized condition, the return being substantially uniform, causes the interior dimension of the bell to be substantially uniform. The same is true of the spigot. Consequently, the external size of the channel on the spigot can be caused to fit the flared interior of the tube in the bell within acceptable tolerances which would be very difficult to maintain if these parts of the pipe were otherwise constructed.

As the channels on the spigot and on the bell are loosely telescoped onto the ends of the tubing in the course of assembly there may be a small amount of clearance between these parts which it is desirable to avoid. The present method of sizing is also advantageous in that the expansion of the tube in the course of expanding it and the channel beyond the elastic limits or yield points of these parts causes the clearance to be automatically taken up and eliminated. Consequently, the channels at the bell and at the spigot will tightly fit around the ends of the tube in the completed structure even though they were loose with respect to each other in the course of assembly.

With the foregoing and other objects in view, which will be made manifest in the following detailed description and specifically pointed out in the appended claims, reference is had to the accompanying drawings for an illustrative embodiment of the invention, wherein:

Figure 1:
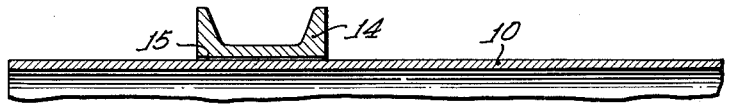
FIGURE 1 illustrates a portion of that end of the metallic tube of a reinforced concrete pipe that is to form the bell end of the pipe showing the channel used at the end of the pipe in assembled relationship therewith.

Referring to the accompanying drawings wherein similar reference characters designate similar parts throughout, 10 indicates a metallic tube which may be formed of mild steel and which extends from end to end of a section of concrete pipe. This tube may ultimately have a concrete lining indicated at 11, applied therein centrifugally or otherwise. It may also ultimately have an outer coating of concrete 12 applied thereto within which helically wound rods or wires 13 are embedded.

On that end of the tube 10 which is ultimately to form the bell end of the pipe section there is telescoped an endless channel 14. This channel may also be formed of mild steel, and in order to facilitate assembly of the channel 14 with the tube 10 there may be a clearance indicated at 15 between the channel and the end of the tube.

After the channel and tube have been assembled an expander, not shown, is placed in the end of the tube to expand the tube outwardly or flare it outwardly as indicated at 16. That portion of the tube which is beyond the end of the lining 11 and which is indicated at 17 may also be expanded into a condition that is approximately cylindrical. Outwardly of this cylindrical portion the tubing may again be flared as indicated at 18.

Figure 2:
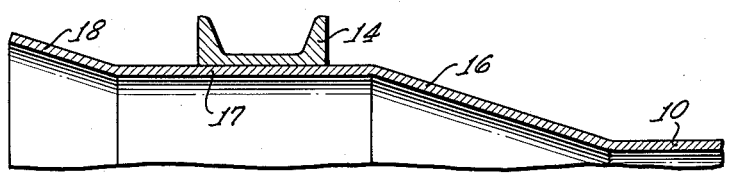
FIG. 2 illustrates the same portion of the tube and its channel after the tube and channel have been expanded beyond the elastic limit and after the expanding means has been withdrawn.

In accordance with the present invention this end of the tube and the channel ring 14 are expanded beyond the elastic limit or yield point of the materials of which the tube and ring are formed. In the course of expansion of the tube 10 the clearance 15 is taken up as is illustrated in FIG. 2, and both materials are expanded beyond the yield point. Preferably, the tube and ring are expanded to an oversize condition wherein the interior diameter of the cylindrical portion is about 0.1%, measured either diametrically or circumferentially, greater than the nominal size that the internal diameter of the portion 17 is to ultimately have. When the yield points of the materials have been exceeded, I find that the metal still possesses some springback and this springback usually measures from 0.085% to 0.115%. Consequently, when the expander has been removed from the interior of the tube the tube and ring will return or contract approximately 0.1% from the oversized or overstressed condition. This springback with a given material is substantially uniform from the overstressed condition so that the final internal size of the portion 17 is uniform within acceptable tolerances, in a similar manner, on the spigot end of the tube 10 there is applied a spigot channel indicated at 19 which may be loosely applied so that there is present a clearance 20. This end of the tube is likewise expanded so that the clearance 20 disappears or is taken up in the course of the initial expansion of the tube 10. The end of the tube 10 and the ring 19 are both expanded beyond the elastic limits of the materials and as above explained, about 0.1% greater than the final nominal external diameter of the spigot. When the expander is removed the ring 19 and this end of the tube 10 will both spring back or contract approximately 0.1% so that the final external diameter of the spigot ring 19 is within such a tolerance that it can be telescoped into the bell end of the pipe when the bell and spigot of adjoining sections are mutually assembled together. Consequently, when the rubber sealing ring 21 is positioned in the channel 19 for the purpose of functioning as a gasket the fit between the exterior of the spigot and the interior of the bell will be sufficiently close so that the sealing ring will function properly.

The reference numeral 22 indicates grout that may be applied over the joint after the bell and spigot have been assembled together.

It will be appreciated that the above-described method provides a means whereby the bell and spigot can be sized with a high degree of accuracy and whereby no expensive machining operations are required to make these portions of the pipe fit each other properly.

While the invention has been developed primarily in connection with the metallic structures in the ends of concrete pipe it may be employed wherever it is desired to manufacture two metallic parts which are ultimately to telescopically fit together, and wherein either of said parts are made up of two parts that are loosely telescoped one upon the other.

Figure 3:
FIG. 3 is a view similar to FIG. 1, but illustrating the spigot channel in assembled relationship with the spigot end of the tube.
Figure 4:
FIG. 4 is a view similar to FIG. 3, but illustrating this end of the tube and the spigot channel as having been expanded.
Figure 5:
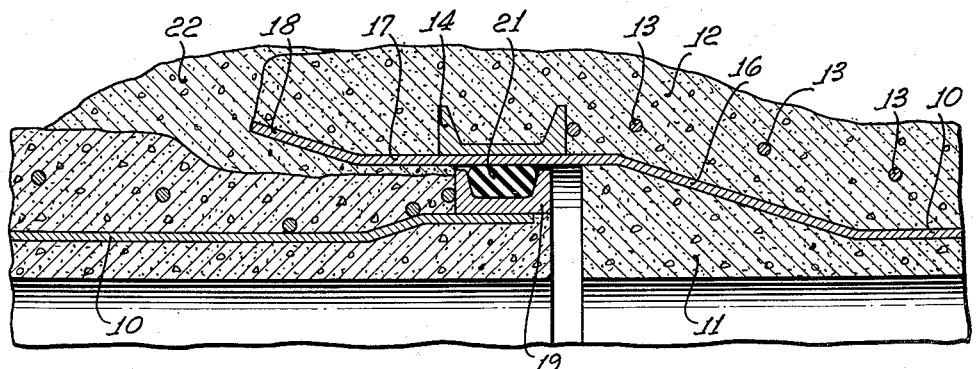
FIG. 5 is a sectional view of a concrete pipe joint, the bell and spigot of which have had their metallic reenforcements sized in accordance with the present invention.

In carrying out the invention it is not necessary that both parts that are initially telescoped together in the course of assembly be stretched or expanded beyond the elastic limits or yield points of both parts. In other words, considering FIGS. 3 and 4, the tube 10 within the endless channel 19 may be expanded beyond the elastic limit or yield point of the material of the tube 10, but without exceeding the elastic limit or yield point of the channel 19. In this event when the expander is removed the channel 19 may tend to return to its initial condition because of the fact that its yield point has not been exceeded. However, as the yield point of tube 10 has been exceeded the clearance 20 will be taken up and a close fit maintained between the tube 10 and the endless ring. Similarly, in the case of the bell the material of the tube 10 may be expanded beyond its yield point but the expansion of the channel 14 need not necessarily have been expanded beyond its elastic limit. Such a construction may be resorted to in the event that the rings are precisely made. However, if the rings are not precisely made then both the tube and the endless ring are expanded beyond their elastic limits and upon having some springback these parts will ultimately have the proper size within the desirable tolerances.

In describing the invention above, reference has been made to the use of mild steel as this is the material usually employed for these parts in the construction of concrete pipe. It will be appreciated that the invention is not restricted thereto but may be employed with other metals and materials which may have different elastic limits or yield points and which may possess different springbacks after the elastic limit or yield point has been exceeded by the expansion. With different materials some laboratory work may be necessary to determine the amount of springback that occurs after the elastic limit or yield point of the particular material selected has been exceeded.

Various changes may be made in the details of construction without departing from the spirit and scope of the invention as defined by the appended claims.

I claim:

1. The method of sizing two annular metal parts with reference to a nominal diameter which parts are ultimately to be telescoped together and which parts each consists of two annular metal sections concentrically arranged which consists of loosely arranging the metal sections of each part in concentric relationship, expanding the inner section of each part independently of the section of the other part into engagement with the outer section of its part to take out all looseness between the sections, continuing the expansion of the inner section sufficiently so as to create an overstressed condition in the metal thereof occasioned by exceeding the elastic limit or yield point of the metal from which the inner section is formed, and also sufficiently so that the external diameter of one part and the internal diameter of the other part exceed the nominal diameter by approximately the same amount, and discontinuing and removing the expansion effort.

2. The method of sizing two annular metal parts with reference to a nominal diameter which parts are ultimately to be telescoped together and which parts also each consists of two annular metal sections concentrically arranged which consists of loosely arranging the sections of each part in concentric relationship, expanding the inner section of each part independently of the sections of the other part into engagement with the outer section to take out all looseness between the sections, continuing the expansion of the inner section of each part sufficiently so as to create an overstressed condition in both sections of each part occasioned by exceeding the elastic limit or yield point of the metal from which the sections forming the parts are formed, and also sufficiently so that the external diameter of one part and the internal diameter of the other exceed the nominal diameter by approximately the same amount, and discontinuing and removing the expansion effort.

References Cited in the file of this patent

UNITED STATES PATENTS

| 1,720,366 | Langenberg | July 9, 1929 |
| 1,953,665 | Wallace | Apr. 3, 1934 |
| 2,216,833 | Barry | Oct. 8, 1940 |
| 2,263,714 | Bloomfield et al. | Nov. 25, 1941 |
| 2,449,428 | Timmons | Sept. 14, 1948 |
| 2,493,127 | Franck | Jan. 3, 1950 |
| 2,569,612 | Laurent | Oct. 2, 1951 |

FOREIGN PATENTS

| 229,114 | Germany | Dec. 2, 1910 |
| 676,569 | Great Britain | July 30, 1952 |
| 689,043 | Great Britain | Mar. 18, 1953 |